United States Patent [19]

Houck

[11] Patent Number: 5,579,849
[45] Date of Patent: Dec. 3, 1996

[54] IMPLEMENT CONVERTIBLE BETWEEN A USE POSITION AND A TRANSPORT POSITION

[76] Inventor: Shane A. Houck, Rte. 1, Box 182, Pennville, India. 47369

[21] Appl. No.: 387,600

[22] Filed: Feb. 13, 1995

[51] Int. Cl.[6] .................... A01B 19/00; A01B 63/32
[52] U.S. Cl. .................... 172/456; 172/311; 280/412
[58] Field of Search ............................. 111/56, 57, 134, 111/136, 152, 194, 927; 172/126, 138, 148, 178, 310, 311, 328, 456; 280/656, 414, 413

[56] References Cited

U.S. PATENT DOCUMENTS

| | | |
|---|---|---|
| 3,356,301 | 12/1967 | Barber et al. |
| 3,437,353 | 4/1969 | Lange. |
| 4,137,852 | 2/1979 | Pratt. |
| 4,319,643 | 3/1982 | Carter et al. |
| 4,445,706 | 5/1984 | Jarosek. |
| 4,506,904 | 3/1985 | Kinzenbaw. |
| 4,518,046 | 5/1985 | Rettig et al. |
| 4,552,375 | 11/1985 | Kinzenbaw. |
| 4,721,168 | 1/1988 | Kinzenbaw. |
| 4,878,545 | 11/1989 | Dyker ................. 172/311 X |
| 4,923,017 | 5/1990 | Meek et al. |
| 5,178,328 | 1/1993 | Broyhill ............... 172/311 X |
| 5,265,898 | 11/1993 | Houck. |
| 5,303,779 | 4/1994 | Friggstad ............. 172/311 |
| 5,346,019 | 9/1994 | Kinzenbaw et al. ...... 172/311 |

*Primary Examiner*—Terry Lee Melius
*Assistant Examiner*—Robert Pezzuto
*Attorney, Agent, or Firm*—Palmatier, Sjoquist & Helget, PA

[57] ABSTRACT

A hitchable and towable implement that is suitable for the attachment of various agricultural tooling and that is convertible between a laterally expanded use position and a laterally narrow transport position. The implement has a wheeled lower center section connectable to a towing tractor by an elongate tongue member. An upper center frame section rotates on the lower center section. Powered and hinged lift arms extend in opposite directions from the upper center section and attach to a pair of wing sections for raising and lowering the wing sections. The wing sections rotate with the lift arms and the upper center section about the lower center section. Rotation of the upper center section one quarter turn swings the wing sections between a lateral position with respect to the lower center frame section and the transport position in which the wing sections are fore and aft of the lower center section. In the use position, lift arms and wing sections are laterally positioned and lowered. The lower center section and wing sections each have attachment bars extending horizontally for the attachment of desired tooling. Hydraulic cylinders provide for the lifting of the wing sections and the rotation of the upper center portion. The raising, lowering and swinging can all be remotely controlled from a tow vehicle.

25 Claims, 5 Drawing Sheets

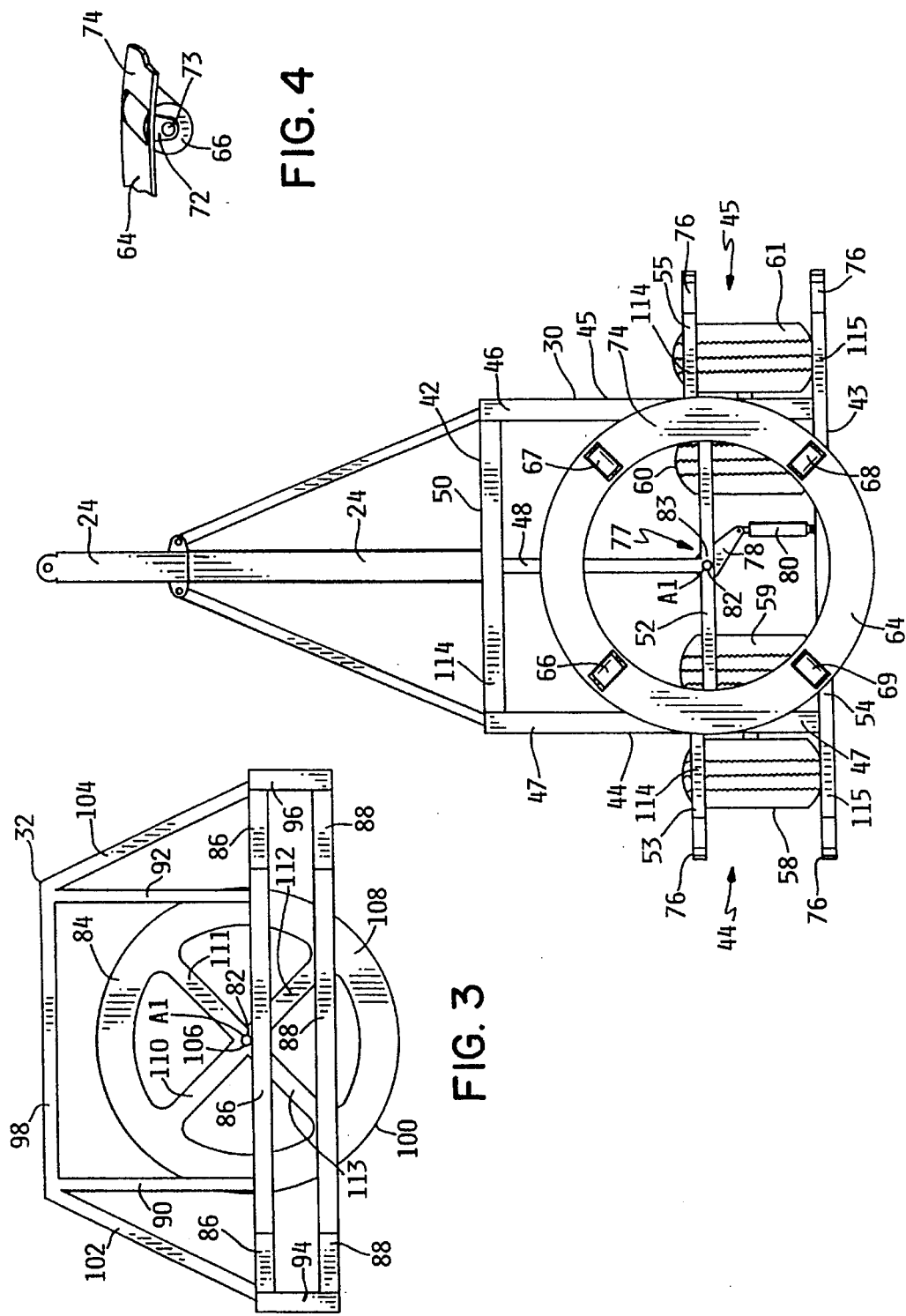

IMPLEMENT CONVERTIBLE BETWEEN A USE POSITION AND A TRANSPORT POSITION

BACKGROUND OF THE INVENTION

This invention relates to a towable implement suitable for agricultural use. More specifically, it relates to a towable implement convertible from the use position to a transport position.

It is desirable to have agricultural implements used for seeding, fertilizing, tilling, or the like to extend as far laterally as possible for covering the maximum amount of acreage in the minimal amount of time. With modern high powered tractors the use of such wide implements provides for very efficient seeding, fertilizing, tilling, etc. However, these configurations can present significant problems in transporting the implements to and from use. Additionally, these wide units present problems in turning during field use. Various attempts have been made to overcome such problems. Typically the implement will be divided up into various gangs or individual sections which will be disconnected before transporting. Some such implements require separate trailers for transporting or have complicated unwieldy systems for reconfiguring the lateral extending implement into a more narrow towable device.

SUMMARY OF THE INVENTION

Disclosed is a hitchable and towable implement suitable for the attachment of various agricultural tooling and that is convertible between a laterally expanded use position and a laterally narrow transport position. The implement has a wheeled lower center section connectable to a towing tractor by an elongate tongue member. An upper center frame section rides and rotates on rollers on the lower center section. Powered and hinged lift arms extend in opposite directions from the upper center section and attach to a pair of wing sections for raising and lowering the wing sections. The wing sections rotate with the lift arms and the upper center section about the lower center section. Rotation of the upper center section one quarter turn swings the wing sections between a lateral position with respect to the lower center frame section and the transport position in which the wing sections are raised and positioned fore and aft of the lower center section. In the use position, lift arms and wing sections are laterally positioned and lowered. The wing sections each have distal end portions with wheels that contact the ground when the wing sections are lowered in the use position. In the lowered use position cooperating coupling members engage the proximal ends of the wing sections to provide additional stability. The lower center section and wing sections each have attachment bars extending horizontally for the attachment of desired tooling. Hydraulic cylinders can provide the power means for the lifting of the wing sections and the rotation of the upper center portion. The raising, lowering and swinging can all be remotely controlled from a tow vehicle.

An advantage and feature of the invention is that only the lateral wing sections are raised in converting from the use position to the transport position. The upper center section rotates but is not lifted. In applications such as fertilizing or seeding operations a sizable tank or hopper of significant weight is carried on the implement. Said containers are suitably positioned on the upper center section whereby the container is rotated as the wing sections are rotated but the container is not raised and lowered with the wing sections. This configuration provides significant advantage in that the design eliminates the need for stronger, more bulky, and heavier lifting arms and linkages and more power for accomplishing said lifting.

Another advantage and feature of the invention is that the lower center section has forward horizontal attachment bars and rearward horizontal attachment bars for attachment of desired tooling. The lower center section does not rotate and does not raise and lower. This configuration eliminates the need for complicated lifting and rotating mechanisms which would typically be required when all of the attachment bars require repositioning during the conversion from the use position to the transport position.

Moreover, the invention provides forward attachment bars and rearward attachment bars with adjacent regions that are substantially clear of any impediments, particularly impediments such as wheels. This allows convenient attachment of tooling across the entire width of the implement both at the forward attachment bars and the rearward attachment bars at any desired spacing. The open regions also allow for versatility in mounting a variety of different attachments at desired spacings. Moreover, the front and rear attachment bar configuration allows attachment of a different tooling in the front as compared to the rear. For example, a tillage or fertilizer attachment may be secured to the front attachment bars and seeding units on the rearward attachment bar or vice versa.

Another advantage and feature of the invention is the axial alignment of the lower center section wheels and the wing section wheels when in the use position. This configuration permits relatively easy turning during use and good contour following characteristics.

An additional feature and advantage of the invention is the use of two wing sections extending in opposing directions from a rotatable section of the central frame structure which provides a balanced configuration that is relatively easily rotated. Moreover, the use of the turntable on the upper center section and the turntable base on the lower center section also further facilitates the easy rotation of the upper center section.

BRIEF DESCRIPTION OF THE DRAWINGS

FIG. 2 is a detail plan view of the lower center section of the central frame structure.

FIG. 3 is a detail plan view of the upper center section of the central frame structure.

FIG. 4 is a detail perspective view showing one of the support rollers.

DETAILED DESCRIPTION OF THE PREFERRED EMBODIMENTS

Figure 1:
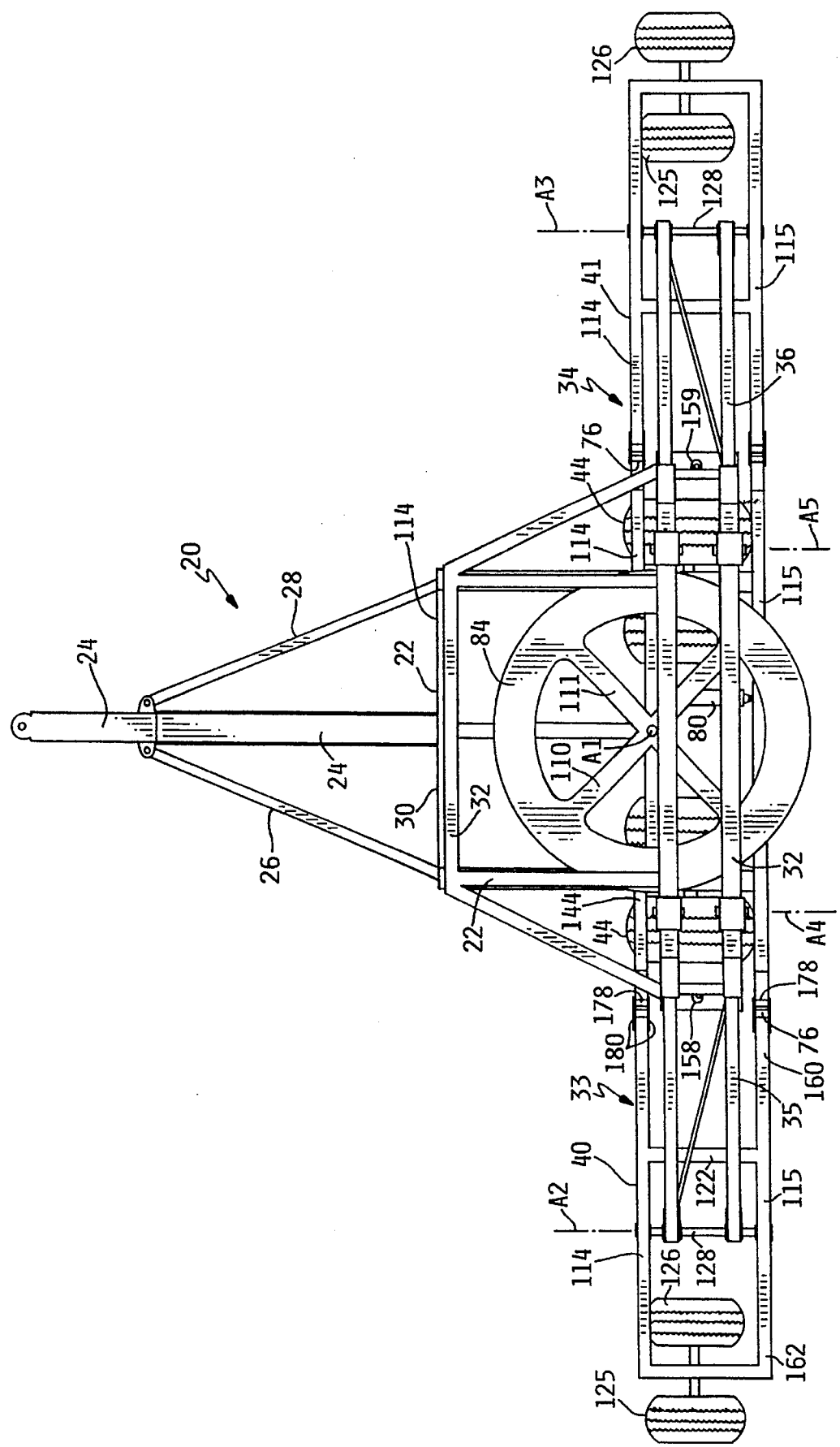
FIG. 1 is a top plan view of the convertible implement in the use position.

Referring to FIG. 1, a plan view of the farm implement is shown and is generally designated by the numeral 20. The implement is principally comprised of the central frame structure 22 which has a tongue member 24 extending forwardly for hitching to the tractor or other tow vehicle. Braces 26, 28 provide additional strength and rigidity to the tongue member. The central frame structure is comprised of a lower center section 30 and a rotatable section shown as an upper center section 32 which is positioned on the lower center section 30. FIGS. 2 and 3 are plan view details of the lower center section 30 and upper center section 32. Extending from the central frame structure 22, specifically the upper center section 32, are a pair of wing assemblies 33, 34 comprised of oppositely directed lifting linkages or lifting arms 35, 36 and wing sections 40, 41. The lifting linkages 35, 36 are hinged to the upper center section 32, are pivotally connected to wing sections 40, 41, and are powered to be raised and lowered.

Referring to FIGS. 2, 3, and 4, the major components of the central frame structure 22 are shown. The lower center section 30 and the central frame structure 22 in general have a front 42, a rear or back 43, and two sides 44, 45. The structural framework of the lower center section 30 has longitudinal frame members 46, 47 and an intermediate longitudinal member 48. Longitudinal member 46, 47, 48 are joined with transverse horizontal frame members 50, 52, 53, 54, 55. The frame members may be of conventional square steel tubing and be joined such as by welding. Ground wheels 58, 59, 60, 61 are suitably attached to the lower center section 30, for example on the longitudinal members 46, 47, by leaf springs. Mounted on the frame members 46, 47, 52, 54 is a turntable base 64 which has four inset support rollers 66, 67, 68, 69, one of which is shown in a detail perspective view in FIG. 4. The support rollers 66, 67, 68, 69 may be mounted by way of tabs 72 welded to the turntable base 64 to support the roller axles 73. The support rollers 66, 67, 68, 69 extend slightly above the top surface 74 of the turntable base 64. The transverse frame members 53, 54, 55 have end portions 75 which are configured as hooks 76 pointing upwardly. The hooks 76 constitute coupling members.

A drive means 77 for rotating the upper center section 32 is shown in FIG. 2 and comprises a drive crank 78 connected to a first power unit configured as a powered cylinder 80 for rotation of a shaft 82. The shaft 82 extends rotatably through the intersection 83 of the intermediate longitudinal member 48 and the transverse frame member 52. Shaft 82 extends upwardly past the turntable base 64 to connect to the upper center section 32. The powered cylinder 80 is suitably anchored to the lower center section 30 at the frame member 54. Other drive means and power units for rotating the upper center section and wing section would include electric or hydraulic motors with gear drives or with chain and sprocket mechanisms. Moreover, in that the two wing sections provide a balanced load on the turntable base, rotation of the upper center section could also be accomplished by manual drive means such as a hand crank or by an individual manually pushing or pulling on one of the wing sections 40, 41 to rotate the upper section with attached wing assemblies.

The upper center section 32 of the central frame structure 22 overlays the lower center section 30. As shown in FIG. 3, the upper center section 32 has a turntable 84 which engages the support rollers 66, 67, 68, 69. Suitably attached to the turntable 84, such as by way of welding, are transverse frame members 86, 88 and longitudinal members 90, 92. Short frame members 94, 96 join the transverse frame members 86, 88. An additional transverse frame member 98 extends beyond the periphery 100 of the turntable 84 and connects the longitudinal members 90, 92, support braces 102, 104 also connect to the longitudinal frame members 90, 92 and the transverse frame member 86. The shaft 82 of the drive means extends upwardly into the center portion 106 of the turntable 84. The center portion connects to the outer portion 108 of the turntable 84 by way of spokes 110, 111, 112, 113. The shaft 82 is suitably fixed to the turntable 84 so that the turntable 84 and upper center section rotate with the shaft 82. The upper center section 32 thus rotates about a vertical axis, designated A1, extending through the shaft 82.

The transverse frame members 50, 52, 53, 54, 55 of the lower center section comprise forward attachment bars 114 and a rearward attachment bar 115 for attachment of desired tooling, not shown.

Figure 5:
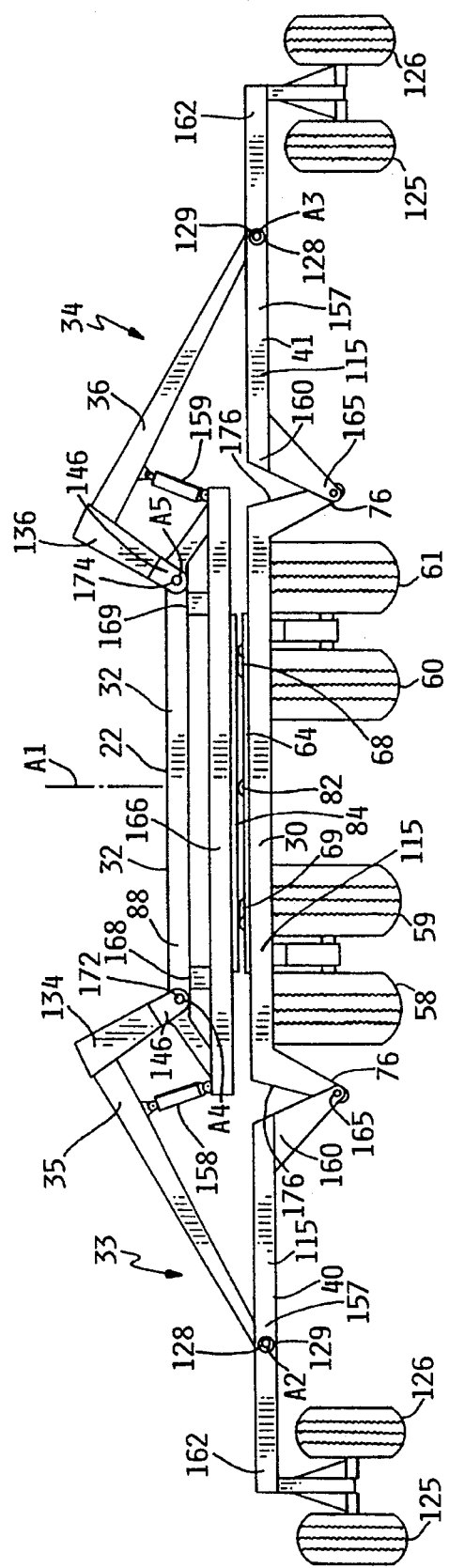
FIG. 5 is a rear elevational view of the implement with the wing sections in the lowered use position.

FIG. 5 is a rear elevational view showing the arrangement of the wing sections 40, 41 and the lifting arms 35, 36 with respect to the central frame structure 22. The upper center section 32 rides on and is rotatable about the lower center section 30.

Figure 6:
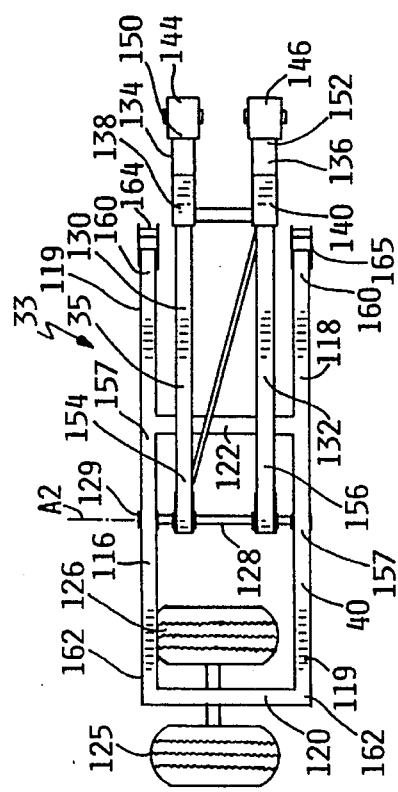
FIG. 6 is a top plan view of a wing assembly with a lifting arm and a wing section.

Referring to FIG. 6, a top plan detail view of one of the wing assemblies, designated the first wing assembly 33 is shown. The first wing assembly 33 is comprised of the first wing section 40 and the attached first lifting arm 35. The wing section 40 has two transverse frame members 116, 118 which constitute forward and rearward attachment bars 114, 115 for attachment of desired tooling, not shown. The wing section 40 also has cross-support members 120, 122. Ground wheels 125, 126 are suitably attached to the cross-frame member 120. A shaft 128 extends between the transverse frame members 116, 118 to form a hinge or connection point 129 for the lifting linkage 35. The first lifting linkage or arm 35 pivots on the shaft 128.

The first lifting linkage or arm 35 is comprised of parallel elongate portions 130, 132 and two generally upright portions 134, 136. Elbow portions 138, 140 join the elongate portions 130, 132 to the generally upright portions 134, 136 to form a rigid connection. Additional couplings 144, 146 are utilized to hingedly connect the upright portions 134, 136 to the transverse frame members 86, 88 of the upper center section 32. The lifting linkage 35 has a pair of proximal portions 150, 152 and a pair of distal portions 154, 156. The attachment of the lifting arm 35 to the shaft 128 and consequently the wing section 40 is at the distal portions 154, 156 of the lifting arm and the mid-section 157 of the wing section 40. The wing section 40 has a pair of proximal end portions 160 and distal end portions 162. The proximal end portions 160 are attached to cooperating coupling members 164, 165 that couple with the coupling members 76 configured as hooks on the transverse frame members 53, 54, 55. The second wing assembly 34 has corresponding structural members as the first wing assembly with a second wing section 41 and second lifting arm or linkage 36 as best shown in FIG. 5.

Continuing to refer to FIG. 5, the wing sections 40, 41 are shown in the lowered position and the apparatus is thus in the use position. The cooperating coupling members 165 are engaged with the hooks 76 which extend from the transverse frame members 53, 54, 55. As best shown in FIG. 2 a drive means 157 for raising and lowering the wing sections 40, 41 is comprised of a pair of power units configured as powered cylinders 158, 159 inserted between and suitably connected to the upper center section 32 and the lifting linkages 35, 36. As shown in FIG. 5, the powered cylinders are in a contracted position. The turntable base 64 is shown with support rollers 68, 69 extending upwardly from the turntable base and contacting the turntable 84. The shaft 82 which is nonrotatably fixed to the turntable 84 is also shown. This view shows a lower transverse frame member 166 positioned under the upper transverse frame members 86, 88. Struts 168, 169 are shown to provide additional support for the upper transverse frame member 86, 88. The lifting arms 35, 36 are hinged to the transverse frame member 88 by way of pins 172, 174. The lifting linkages or arms 35, 36 thus rotate about horizontal axis of rotation designated A4 and A5.

Figure 7:
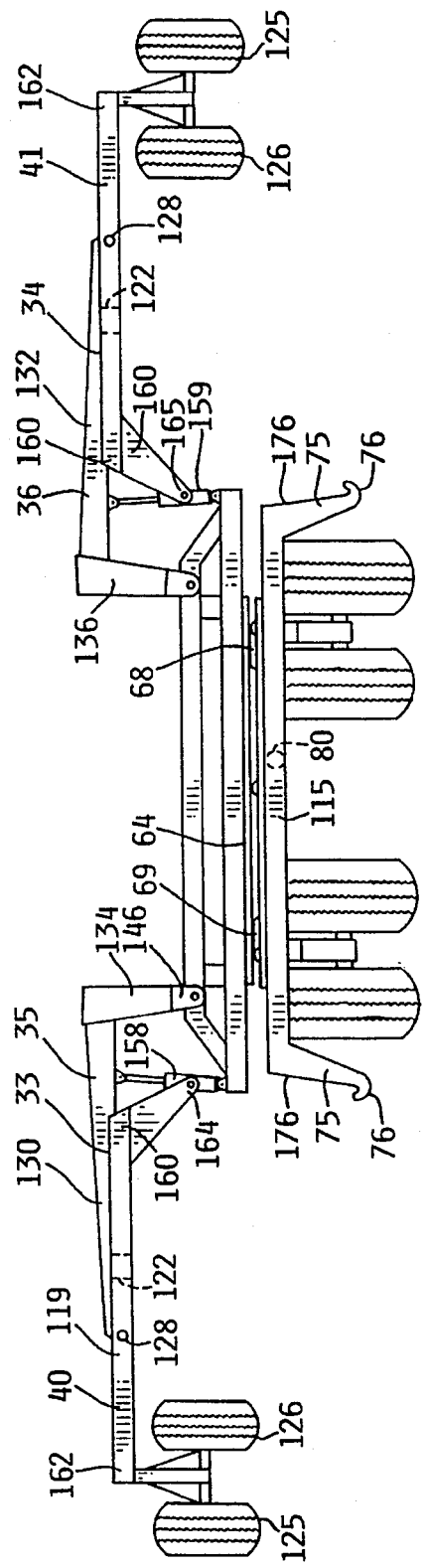
FIG. 7. shows the same view as FIG. 5 with the wing sections in a raised position.

Referring to FIG. 7, the same elevational view as FIG. 6 is shown with the wing sections 40, 41 in an elevated or raised position. The powered cylinders 158, 159 are shown in an extended position. The cooperating coupling members 164, 165 on the end portions 160, 162 of the wing sections 40, 41 are shown dislocated from the hooks 76. The wing sections 40, 41 maintain a substantially horizontal position as shown by way of the engagement of the elongate portions 130, 132 with the cross-members 122, shown in dashed lines, of the wing sections 40, 41.

Figure 8:
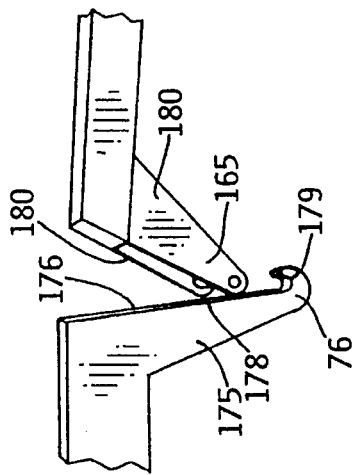
FIG. 8 is a detail elevational view of the hook and cooperating coupling member in a disengaged position.

FIG. 8 shows the detail of a cooperating coupling member 165 disengaging or engaging one of the coupling members 76 configured as a hook. The hooks 76 have a shank 175 which provides an engagement surface 176 that guides the cooperating coupling member 165 during raising or lowering of the wing sections 40, 41. The cooperating coupling members 165 have a pin 178 which seats in the recesses 179 in the hooks 76. The pin 178 is supported by the end portions 160, 162 configured as triangular panels 180. The coupling members 76, 164, 165 provide stabilization of the wing sections 40, 41 while allowing the wing sections 40, 41 to follow ground contours.

Figure 9:
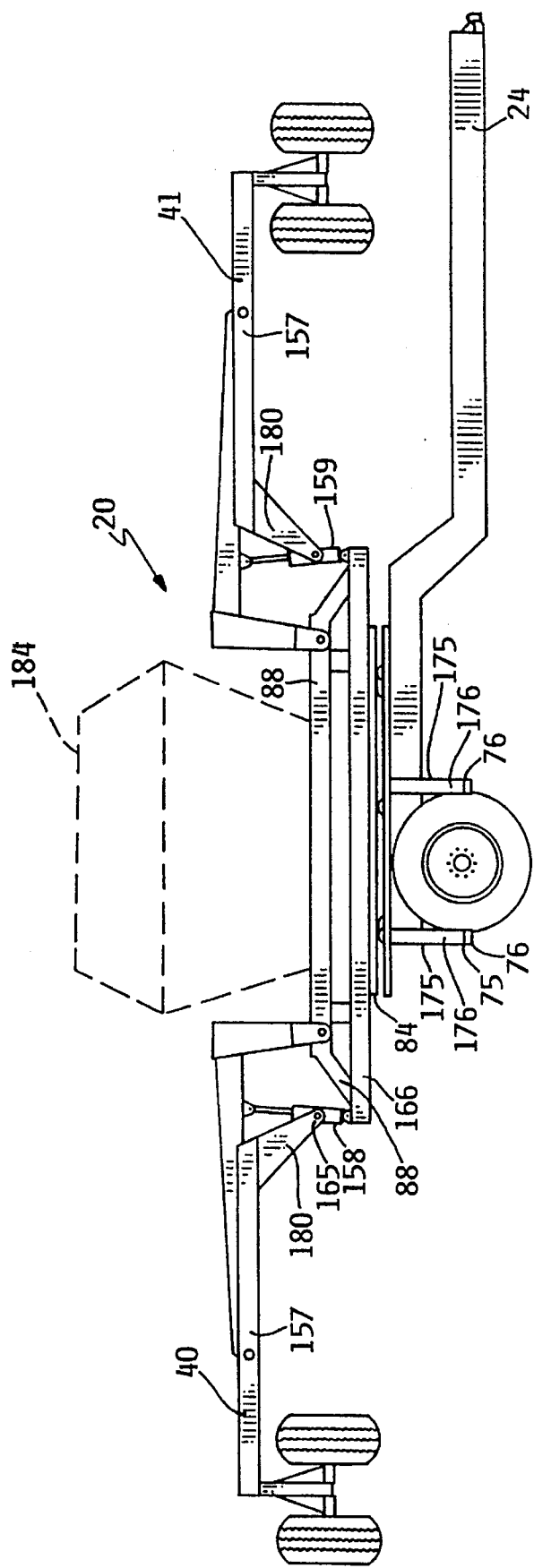
FIG. 9 is side elevational view of the implement in the transport position.

Referring to FIG. 9, the implement 20 is shown in the transport position with the wing sections 40, 41 in the raised position and with the turntable 84 and upper center section 32 rotated one quarter turn from the use position such that the second wing section 41 is positioned in front of the lower center section 30 and above the tongue member 24. The first wing section 40 is positioned rearwardly of the lower center section 30 and the frame structure 22. The wing sections 40, 41 and the central frame structure 22 are thus in substantial alignment with the direction of travel of the implement 20.

FIG. 9 also shows a container 184 in phantom lines positioned on or within the frame members 86, 88, 90, 92, 98. Such a container 184 could be a hopper or a tank and may be utilized with appropriate tooling mounted on the attachment bars. Such tooling, not shown, could comprise grain drills for seeding, or sprayers for the application of fertilizer, herbicides, or insecticides.

The device operates as follows: Referring first to FIGS. 1 and 5, the implement 20 is shown in the use position with the wing sections 40, 41 lowered and adjacent to the sides of the lower center section 30. The coupling members 164, 165 are engaged with the hooks 76 and the ground wheels 125, 126 are on the ground. Thus, any tooling attached to the attachment bars 114, 115 is in proximity to the ground. To convert to the transport position the wing sections 40, 41 are raised by way of the extension of the powered cylinders 158, 159. Said extension raises lifting arms 35, 36 to raise the wing sections 40, 41. With the implement configured as shown, the end portions 160, 162 will first raise releasing the cooperating coupling members 164, 165 from the hook 76. The wing section wheels 125, 126 will remain momentarily on the ground due to their greater weight as compared to the end portions 160, 162 with respect to the shaft 128 which functions as a pivot point.

Referring next to FIG. 7, the continued extension of the powered cylinders 158, 159 continues to raise the wing sections 40, 41 and the coupling members 164, 165 ride up the engagement surface 176. The cross members 122 of the wing sections 40, 41 contact the elongate portions 130, 132 of the lifting arms 35, 36 which prevents further tilting of the wing section 40, 41. As the powered cylinders continue to extend, the lifting arms 35, 36 continue to lift upwardly to raise the wing sections 40, 41 to a substantially horizontal position as shown in FIG. 7.

The drive means 77 for rotating the upper center section is then activated by expanding the powered cylinder 80 to push the crank 78 which rotates the shaft 82, best shown in FIGS. 1 and 2. This shaft 82 is fixed to the center portion 106 of the turntable 84 thus causing the turntable 84 to rotate with the shaft 82. The turntable 84 rides on the support rollers 66, 67, 68, 69 to facilitate the rotation of the upper center section 32 and wing assemblies 33, 34 and to minimize the loading on the shaft 82. The powered cylinder 80 is extended until the upper center section 32, along with the attached lifting arms 35, 36 and wing sections 40, 41 have moved into the transport position as shown in FIG. 9. In the transport position, the wing sections 40, 41 and the central frame structure 22 is in substantial alignment with the direction of travel of the implement.

Significantly, when the apparatus 20 is in the use position, all of the wheels 58, 59, 60, 61, 125, 126 are substantially aligned axially providing easy maneuverability in towing. This is of particular advantage in making turns in the field.

Moreover, additional wheels could be provided in proximity to the proximal end portions 160 of the wing sections 40, 41 to provide improved contour following capabilities of the apparatus.

The powered cylinders for the drive means are suitably hydraulic cylinders which are connected to a conventional control unit and hydraulic pressure source by hydraulic lines, not shown. The control unit for the powered cylinders or other power units may be located in a convenient position such as on the tractor in proximity to the operator position.

Although the lifting linkages 35, 36 are shown as a rigid lifting arm, articulated linkages with pivoting joints such as four-bar linkages are also contemplated and are intended to be included within the definition of lifting linkages.

The coupling members 76 shaped as hooks could also have the open hook closed to form an aperture and the pin 178 of the cooperating coupling members 164, 165 could be removable to permit the joint to be releasably locked by way of insertion and removal of the pin 178.

The apparatus may be constructed by conventional means using suitably sized steel plate stock and square tubing welded or otherwise conventionally joined and fastened.

Alternate drive means for raising and lowering the wing sections 40, 41 in addition to the powered cylinders would be cable systems with a winch. Such a winch could be driven by an electric motor, hydraulic motor, a pneumatic motor or by a hand crank.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An apparatus for towing behind a tow vehicle, the apparatus having a use position and a transport position, the apparatus comprising:

a) a central frame structure comprising a lower center section and an upper center section, the lower center section having two sides, a front, a rear, and wheels for contacting the ground, the upper center section positioned above and rotatably attached to the lower center section, the upper center section having two sides and riding upon the lower center section as it rotates;

b) a pair of lifting linkages, each lifting linkage comprising distal and proximal end portions, the lifting linkages hinged to the upper center section at the proximal end portion with the distal end portions extending laterally outward from the upper center section whereby the distal end portions are moveable upwardly and downwardly;

c) a pair of wing sections, each wing section connected to a distal end portion of one of the linkages whereby the wing sections are raiseable and lowerable with respect to the central frame structure between a substantially horizontal lowered position and a substantially horizontal raised position and whereby the upper center section does not raise or lower with said wing sections; and d) the upper center section and the wing sections rotatable between the use position where the wing sections are laterally positioned with respect to the lower center section and the transport position where one of the wing sections is positioned forwardly of the lower center section and the other wing section is positioned rearwardly of the lower center section.

2. The apparatus of claim 1 wherein each wing section further comprises a wheel for contacting the ground when the wing section is in the lowered position.

3. The apparatus of claim 1 wherein each side of the lower center section has a coupling member, and wherein each wing section has a cooperating coupling member sized and positioned to engage the coupling member when each wing section is in the lowered position and laterally positioned with respect to the lower section.

4. The apparatus of claim 1, wherein the lower center section has an attachment bar for attachment of tooling and the wing sections each have a attachment bar for attachment of tooling.

5. The apparatus of claim 4, wherein the lower center section bar is at the rear of the lower center section and the attachment bars attached to the wing sections are aligned end-to-end with the lower center section attachment bar.

6. The apparatus of claim 1, further comprising a drive means for raising and lowering the lifting linkages comprising a powered cylinder.

7. The apparatus of claim 1, further comprising a drive means for rotating the upper center section and the wing sections, said drive means comprising a crank connected to the upper center section and a powered cylinder connected between the crank and the lower center section.

8. The apparatus of claim 1, wherein the upper center section further comprises a horizontal turntable, the lower center section further comprises a horizontal turntable base, the turn table engaged with the turntable base for rotation of the upper center section.

9. The apparatus of claim 1 further comprising a plurality of support rollers attached to the lower center section and positioned between the upper center section and lower center section whereby the upper center section is supported thereon.

10. The apparatus of claim 1, wherein the wing sections each have a midsection and the distal end portions of the lifting linkages are attached to the wing sections at the midsections.

11. The apparatus of claim 4, wherein each lifting linkage consists of a rigid lifting arm.

12. A farm implement to be towed behind a tractor during field use and during transport, the implement convertible between a laterally expanded use position and a laterally narrow transport position, the implement comprising:

a) a central frame structure comprising a lower center section and a rotatable section, the lower center section comprising a front, a rear, two sides, and having ground wheels extending therefrom, the rotatable section rotatably mounted on the lower center and having opposite sides and a substantially vertical axis of rotation, the rotatable section not raiseable or lowerable with respect to the lower center section;

b) a tongue member extending forwardly from the lower center section for hitching to the tractor;

c) a pair of lifting linkages, each lifting linkage having a proximal portion and a distal portion, the proximal portions of the lifting linkages pivotally connected to the rotatable section with a substantially horizontal axis of rotation and with the two distal portions extending in laterally opposite directions outward from the rotatable section, whereby the distal positions of the lifting linkages are raiseable and lowerable;

d) two wing sections for attachment of agricultural tooling, each wing section having a midsection and an outwardly extending substantially horizontal frame member, each wing section pivotally connected with a horizontal axis of rotation at the midsection to one of the distal portions of the linkages, whereby the wing sections are raised and lowered with respect to the rotatable section and lower center section between a raised position and a lowered position as the distal portions of the linkages are raised and lowered, and whereby the horizontal frame member is substantially horizontal at the raised position and at the lowered position, the wing sections rotatable with the rotatable section whereby the implement has a use position wherein the wing sections are in a lowered position adjacent to the sides of the lower center section and a transport position wherein the wing sections are in a raised position and wherein the rotatable section is rotated substantially one quarter turn whereby one wing section is positioned in front of the lower center section and the other wing section is positioned rearwardly of the lower center section.

13. The apparatus of claim 12, wherein the rotatable section further comprises a horizontal turntable, the lower center section further comprises a horizontal turntable base, the turntable engaged with the turntable base for rotation of the rotatable section.

14. The farm implement of claim 13 further comprising a pair of wheels for engaging the ground, one wheel secured to each wing section at the distal end portions.

15. The farm implement of claim 14, wherein the lower section further comprises two coupling members, one positioned at each side of the lower section, and wherein the wing sections are each further comprised of cooperating coupling members on each proximal end portion for engaging with the coupling members when the implement is in the use position.

16. The farm implement of claim 12 wherein the lower center section comprises a rearward horizontal attachment bar and each wing section comprises a rearward horizontal attachment bar.

17. The farm implement of claim 16 wherein the lower center section further comprises a forward attachment bar and each wing section comprises a forward attachment bar.

18. The apparatus of claim 4, wherein each lifting linkage consists of a rigid lifting arm.

19. A towable farm implement comprising:

a) a central frame structure comprising a lower center section with attached ground wheels and a rotatable section rotatable about a vertical axis and engaged with the lower center section whereby the rotatable section rotates but is not raiseable or lowerable, the central frame structure having a front, a rear, and two opposite sides;

b) a first wing assembly comprising a first wing section and a first lifting arm; the first wing section positioned at one side of the central frame structure, the first lifting arm extending laterally from the rotatable section and having two end portions with one end portion hingedly attached to the rotatable section and the other end portion pivotally attached to the first wing section is positioned at the side of the central frame structure and is raiseable and lowered between a first wing section horizontal lowered position and a first wing section horizontal raised position;

c) a second wing assembly comprising a second wing section and a second lifting arm; the second wing section positioned at the side of the central frame structure opposite the first wing section, the second lifting arm extending laterally from the rotatable section and having two end portions with one end portion hingedly attached to the rotatable section and the other end portion pivotally attached to the first wing section whereby the second wing section is positioned at the side of the central frame structure and is raiseable and lowerable between a second wing section horizontal lowered position and a second wing section horizontal raised position; and d) a power unit connected to the rotatable section for rotating the rotatable section and the attached first and second wing assemblies, whereby when the first and second wing sections are in the raised positions and the rotatable section rotates the first wing section swings from the side of the central frame structure to the rear of the central frame structure and the second wing section swings from the opposite side of the central frame structure to the front of the central frame structure.

20. The implement of claim 19 wherein each wing section further comprises a wheel for contacting the ground when the wing section is in a lowered position.

21. The apparatus of claim 20 wherein each side of the lower center section has a coupling member, and wherein each wing section has a cooperating coupling member sized and positioned to engage the coupling member when each wing section is in the lowered position and laterally positioned with respect to the lower section.

22. The apparatus of claim 19, wherein the lower center section has an attachment bar for attachment of tooling and the wing sections each have a attachment bar for attachment of tooling.

23. The farm implement of claim 19 wherein each wing section has a midsection, a proximal end portion, and a distal end portion and the lifting linkages are pivotally connected to the wing sections at the midsections.

24. The apparatus of claim 19, wherein the lower center section attachment bar is at the rear of the lower center section and the attachment bars attached to the wing sections are aligned end-to-end with the lower center section attachment bar.

25. The apparatus of claim 1, wherein all the wheels are axially aligned when the apparatus is in the use position.

* * * * *